United States Patent [19]

Petter

[11] Patent Number: 5,246,397
[45] Date of Patent: Sep. 21, 1993

[54] SPACER RACK FOR SMOKE DETECTON HAVING SEPARABLE SECTIONS

[75] Inventor: Jay C. Petter, Pentwater, Mich.

[73] Assignee: Pentwater Wire Products, Inc., Pentwater, Mich.

[21] Appl. No.: 919,600

[22] Filed: Jul. 22, 1992

Related U.S. Application Data

[62] Division of Ser. No. 674,395, Mar. 25, 1991, Pat. No. 5,160,294.

[51] Int. Cl.⁵ ............................................. F23J 11/08
[52] U.S. Cl. .................................... 454/1; 454/370
[58] Field of Search ............. 220/491; 34/204, 208 R; 108/51.1, 53.1; 211/190, 191, 59.4; 454/1, 77, 79, 78, 118, 175, 237, 241, 357, 370

[56] References Cited

U.S. PATENT DOCUMENTS

| | | | |
|---|---|---|---|
| 114,534 | 5/1871 | Dole | 454/88 |
| 2,735,568 | 2/1956 | Bitney | 220/491 X |
| 2,821,029 | 1/1958 | Simons | 454/88 X |
| 3,071,045 | 1/1963 | Budd | 454/175 X |
| 3,157,106 | 11/1964 | Leach | 454/175 X |
| 3,800,686 | 4/1974 | Otsuka et al. | 454/237 |

Primary Examiner—Harold Joyce
Attorney, Agent, or Firm—Price, Heneveld, Cooper, DeWitt & Litton

[57] ABSTRACT

A narrow chimney-like airflow space between vertical columns of stacked, palletized loads is created by a narrow rectangular shaft of open mesh wire creating a narrow vertical passage extending the full height of the columns of palletized loads up which smoke can travel by convection to reach a smoke detector and trigger an alarm. The shaft is formed by a pair of L-shaped elements connected by detachable means whereby the elements can be separated and nested for compact storage.

6 Claims, 2 Drawing Sheets

U.S. Patent  Sep. 21, 1993  Sheet 1 of 2  5,246,397
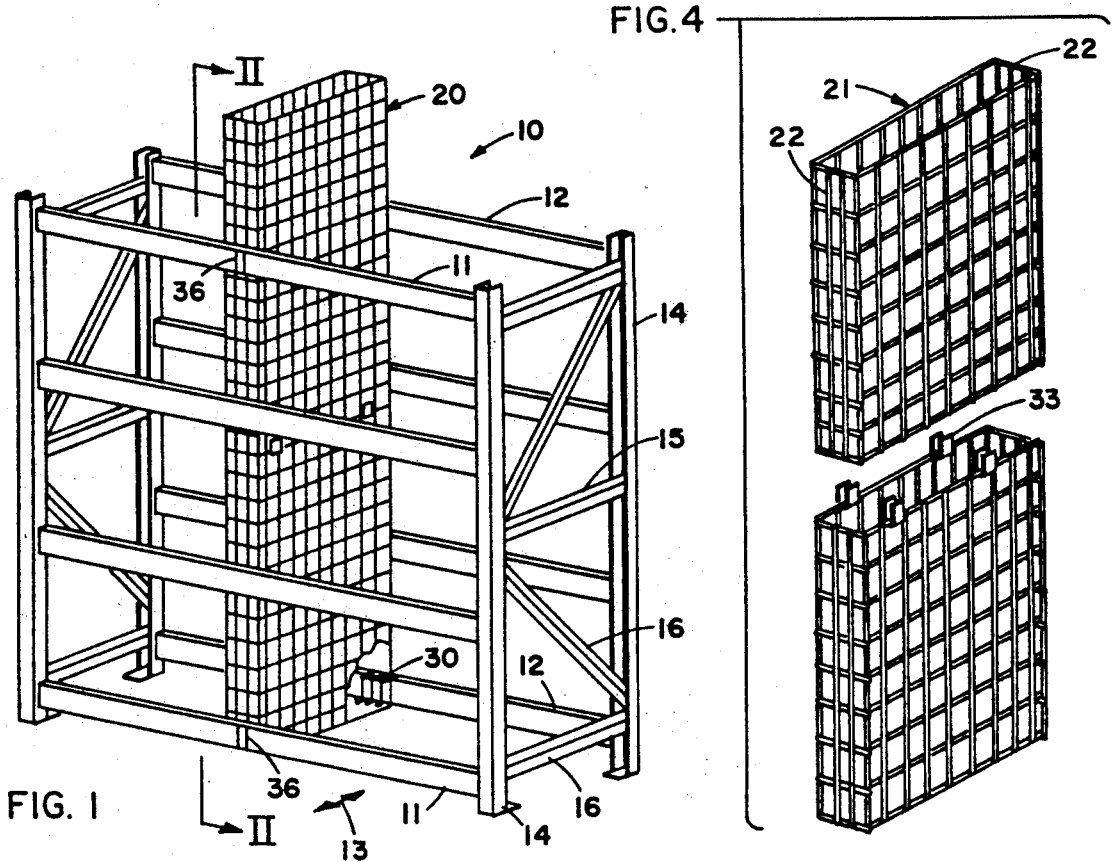
FIG. 4
FIG. 1
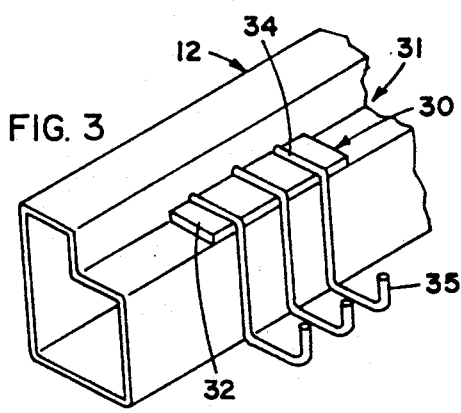
FIG. 3
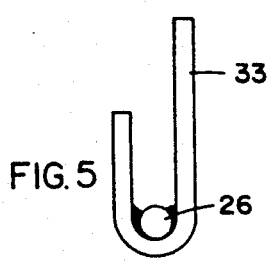
FIG. 5
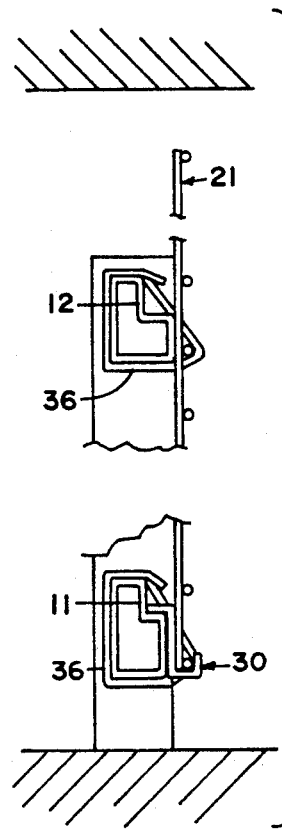
FIG. 2

SPACER RACK FOR SMOKE DETECTON HAVING SEPARABLE SECTIONS

This is a divisional of copending application Ser. No. 674,395, filed on Mar. 25, 1991, now U.S. Pat. No. 5,160,294.

SUMMARY OF THE INVENTION

The invention is an open mesh, heavy gauge wire column which extends from front to back of a storage rack for pallets between vertical columns of stacked, loaded pallets or on each side of pairs of such columns to create a passageway up which smoke can pass by convection to adjacent the ceiling of a warehouse where the existence of the smoke can be detected by suitable means and, thus, an alarm triggered, giving notice that some type of combustion is occurring.

BACKGROUND OF THE INVENTION

In the big and highly complex modern warehouses in which, in many cases, millions of dollars worth of goods and articles are stored, it has been conventional practice to store the articles on pallets which are arranged in vertical columns, floor to ceiling. To effect efficiency of space use, the columns are often placed so close together that there is little or no space between them to form an air passage. Further, even if there is a passage forming space between adjacent pallet load columns, because the columns are created by stacking a number of pallets, one above the other, if any one of the pallets is offset to the side of the column in which it is positioned, it can obstruct the passage between the sides of adjacent columns of stacked, loaded pallets. To conserve space and reduce overhead, the operators who stack and unstack the loaded pallets have a strong incentive to arrange the columns of stacked pallets as close to each other as they can. Add to this that warehouses are frequently under pressure to make maximum use of their floor space both to accommodate the demand and to obtain the best return on the investment in warehouse space. Another contributing factor can be gradual deforming of the loads on the pallets, eventually resulting in restriction or closure of the space between adjacent columns of stacked palletized articles.

This has been found to be a serious deficiency in modern warehousing, particularly in the large, high ceiling warehouse wherein the columns of palletized stored articles are high. In each of these cases, the articles themselves become barriers to the movement of smoke from an incipient fire to a position near the ceiling where the presence of the smoke could be detected at a very early stage of a fire. As warehousing has become larger and more complex and the value of what is being stored has been increasing, the exposure has become an increasingly serious problem and, in some cases, an unacceptable financial risk. While the importance of early detection has long been recognized as a critical factor in controlling fire damage losses, the problem of providing dependable, early fire detection means in large, modern warehouses has not heretofore been solved. It has continued to be a situation in which the fire may well have progressed to a point where it is already well established before any type of alarm is given. This not only makes the problem of extinguishing the fire substantially more complicated, it also materially increases the extent of the damage even from a fire which, even at a relatively early stage, is extinguished.

This invention is directed to providing a simple, dependable and relatively inexpensive solution to this problem.

BRIEF DESCRIPTION OF THE INVENTION

A major factor controlling the ability of the warehouse alarm system to detect the existence of a fire at a very early stage is that of assuring early exposure of the fire detection equipment to the products of the fire, such as smoke. To this end, this invention provides what, in effect, is a narrow, permanent chimney between stacked columns of palletized articles which will automatically create a free zone up which smoke will pass to the top of the warehouse space where the fire and smoke detection equipment exists. The invention positively prevents obstruction of this passage. While the invention is particularly directed to providing an open passage which will always be available, through which smoke in the early stages of a fire can reach the detection equipment, it will also be recognized that this invention provides means by which heat generated from such a fire will reach detection equipment at a very early stage. This is done by providing permanent columnar, airflow passages between vertical stacks of palletized articles, such that any smoke emanating from the products on any of the pallets, when escaping from the side of the load on the pallet, will enter one of these vertical passages and be taken directly up to the ceiling of the storage space where smoke detectors will be exposed to the smoke. In those situations in which, in addition to smoke, heat detectors are provided, an alarm will be generated at a early stage in the fire. The invention provides this type of system in a manner which does not, in any way, interfere with the normal use of the storage racks and, once installed, is permanent and does not require any service or other maintenance other than to note that it has not been seriously damaged by misdirected equipment used to load and unload the pallets of product. The invention does not require the installation of any additional detection or that of auxiliary airflow movement equipment. Further, it utilizes a minimum of actual storage space.

BRIEF DESCRIPTION OF THE DRAWINGS

FIG. 1 is an oblique view of a typical empty storage rack with one of the shaft-like airflow units installed with a small portion of the lower end of the unit partially broken away;

FIG. 2 is a broken, vertical view taken along the plane II—II of FIG. 1;

FIG. 3 is an enlarged, oblique, fragmentary view of the bottom support for an airflow unit of this invention;

FIG. 4 is an oblique view of a pair of the airflow units forming an airflow shaft, illustrated in separated condition before being joined;

FIG. 5 is a fragmentary view of one of the stabilizer clips used to interconnect the sections of the airflow shaft of this invention;

DESCRIPTION OF THE PREFERRED EMBODIMENT

Figure 9:
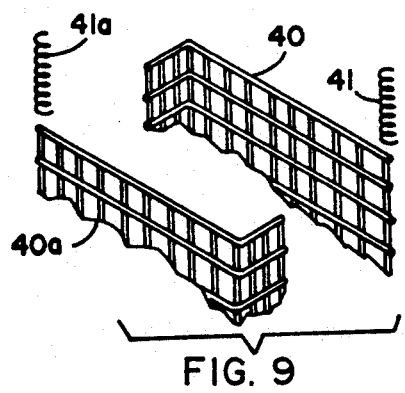
FIG. 9 is an oblique fragmentary exploded view of a modified construction for one of the airflow shaft unit.

Referring to the drawings and specifically to FIG. 1, the numeral 10 indicates a storage rack of conventional design in which palletized goods are stored in vertical columns with the pallets resting on the front rails 11 and the rear rails 12 of the rack. The palletized articles are placed on the racks by suitable means, such as forklift equipment which has access to the rack in the direction of the arrow 13 (FIG. 1). The pallets rest on the front and back rails 11 and 12 which rails are arranged in pairs at suitable, vertical spacings with each spacing being vertically large enough to accept a fully loaded pallet. The rails 11 and 12 are supported by vertical columns 14, preferably braced by the members 15 and 16. How these are interconnected is not part of this invention, although, in most warehouses, it is conventionally done by suitable bolting. The length of each storage rack 10 is governed by design factors of strength and accessibility and is not particularly relevant to this invention except that, if the rack is designed to hold four vertical columns of the pallets, those who are specifying the use of this invention will have to decide whether the invention should be applied between a pair of adjacent columns or applied only between the columns at the center of the rack since the opposite sides of the dual columns will be exposed in another manner. This, however, is a matter which depends upon the design of the racks, including their configuration and the number of columns of palletized articles for which the rack is designed.

Figure 8:
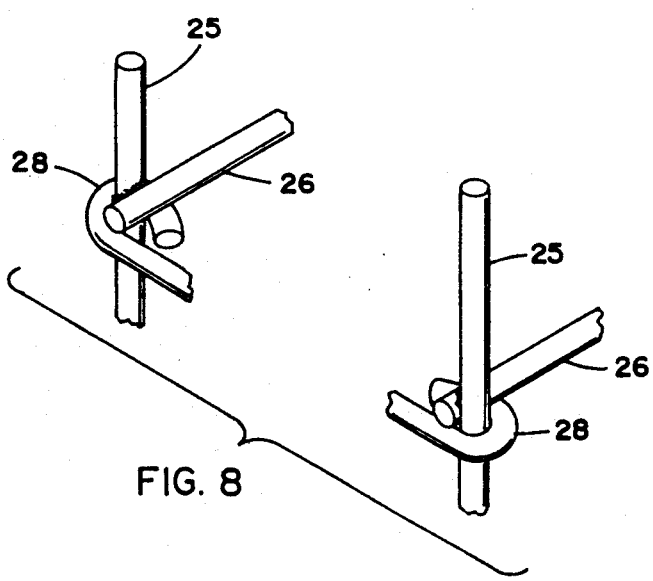
FIG. 8 is a fragmentary, oblique view of a typical end of one of the airflow shaft units, illustrating the connection of the end and side panels of the shaft.
Figure 7:
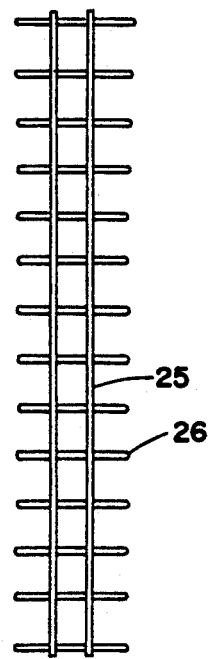
FIG. 7 is an end view of one of the airflow shafts.

Each airflow shaft or chimney 20 consists of a pair of side panels 21 and a pair of end panels 22 each formed of welded together lengths of steel rod 25 and 26 to form an open mesh. The openings in the mesh can each be two, four or more inches on a side because they are not intended to prevent the escape of articles from the pallet into the shaft. They are, however, intended to prevent the articles extending into the shaft either because of mislocation of the pallet or slumping of the load on a pallet toward one side. Three-sixteenths or one-fourth inch diameter rod would, in most cases, be quite adequate. The rods are arranged to form an open mesh such that most of their surface is open and through which gases can freely pass. The vertical rods 25, where they intersect the horizontal rods 26, are welded together to form a rigid panel. In a similar manner, the vertical rods 25 of the end panels are welded to the horizontal rods 26. However, the ends of the horizontal rods 26 of the end panels are formed into loops 28 around the end vertical rods 23 of the side panels (FIG. 8). By means of this construction, for the purpose of shipping or storage, the entire shaft or chimney can be folded substantially flat. This is a material saving in storage and transport space. Also, during storage and transport, it helps minimize damage.

For the purpose of erecting the airflow shaft 20 in a storage rack, first a support hanger 30 is seated on the recess 31 of each of the front and back, bottom rails 11 and 12 (FIGS. 1 and 3). The support hanger has a plate 32 to which are attached a plurality of spaced fingers 33 each having an upper portion 34 which seats on and is welded to the plate 32. Each finger 33 has a hook portion 35 at its lower end on which the bottom of an end panel 22 of one of the erected airflow shaft units seats.

When the height of the storage area is such that more than one of the airflow shaft units are necessary, a second airflow shaft unit is telescopically seated on top of the one already in place (see FIGS. 1 and 4). It will be recognized that, depending upon the height of the storage, one or more additional units of the airflow shaft can be added to the first two, forming a vertical column extending almost from floor to ceiling.

The lower one of a pair of the vertically stacked airflow shaft units is equipped on each side with a pair of U-shaped, upstanding flanges 33 designed to seat the bottom of the next airflow shaft unit which is seated on it (FIGS. 4 and 5). These flanges stabilize the position of the airflow shaft units in a sideways direction while the front and back rails 11 and 12 of the storage rack stabilize the position of the ends of the airflow shaft thereby eliminating the necessity for any clips or flanges 33 at the ends. It will be noted that the flanges are designed to closely fit about the bottom horizontal rods of the unit above, thus forming a vertical column which does not have sides that will snag either the pallets or the goods on the pallets that are placed immediately adjacent them. It will be recognized that the flanges could be welded to and depend downwardly from the bottom of the upper one of the two units without changing their function. At both the top and the bottom of the storage rack, the airflow shafts are clamped to the front and back rail members 11 and 12 by suitable means such as straps 36 which wrap around one of the horizontal rods 26 of the end members pulling them tightly against the adjacent front and back rails 11 and 12, respectively. This can be done at each of the rails 11 and 12 or, in some cases, as illustrated, these straps may be omitted in the case of certain ones or all of the rails intermediate the top and bottom of the rack 10. It will be recognized that the use of these straps positively stabilizes the position of the erected airflow chimney lengthwise of the rails 11 and 12, thus maintaining specifically defined storage spaces on each side of each of the chimneys. This is essential to avoid interference with the placement and removal of the pallets and their loads.

The placement of these airflow shafts can vary. In some warehouses, it may be considered necessary or desirable to locate one of the shafts between each pair of adjacent columns of palletized product. However, under normal circumstances, locating one of the airflow shafts between each pair of columns of palletized product would be adequate. In this arrangement, each column of pallets will be exposed to the chimney effect on one side and the fact of an updraft adjacent that exposed side or face of the pallets will tend to draw any smoke toward the airflow shaft.

Figure 10:
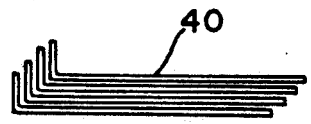
FIG. 10 is a side view of the airflow shaft halves stacked for storage.
Figure 6:
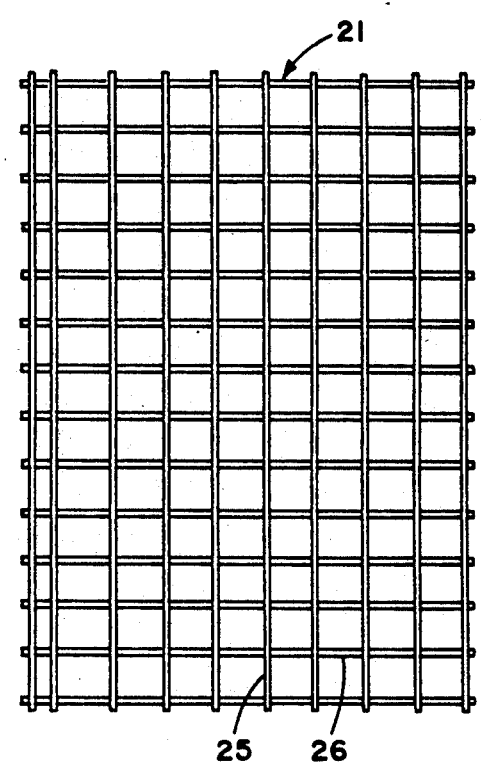
FIG. 6 is a side elevation view of one of the airflow shafts.

During shipment, storage and those occasions when it may be necessary to temporarily disassemble the airflow shafts, substantial space can be saved by making the individual units collapsible for compact storage. FIGS. 9 and 10 illustrate a modification of the airflow shaft units designed to accomplish this. In this modification, each shaft unit consists of a pair of L-shaped components 40 and 40a which are joined by a pair of spiral fasteners 41 and 41a. When separated as illustrated in FIG. 9, each half can be stored flat and nested one within another. This effects a substantial saving in storage space. When they are to be put into service, the units can be reassembled simply by winding or screwing the spiral fasteners into place in a manner similar to the use of a corkscrew to secure together the two components. Each of two halves of the shaft can have the narrow end unit hingedly joined to it or made rigid as by welding. In either case, the unassembled halves of the airflow shaft is suitable for compact storage When the storage racks are equipped with this invention, the space within each of the air shafts formed by the invention provides a passage which, under all normal circumstances, will provide a channel up which air will move as a result of thermal convection. Even in chilled storage, there will be at least same degree of this type of movement. In the case of fire, even in the case of a low-grade smoldering fire, there will be some heat generation which will materially accelerate the rate of upward flow of the air, thus transporting any smoke or the like into the vicinity of the smoke detectors at an early stage of the fire. Thus, these units provide early and positive warning of fire and, since they do not depend upon any mechanical forces other than those that are generated under almost all circumstances in a storage unit, they are not subject to mechanical breakdown or failure. Thus, they have a high degree of reliability.

Having described a preferred embodiment of this invention, it will be recognized that various modifications of the invention can be made without departing from the principles of the invention. Such modifications are to be considered as included in the hereinafter appended claims unless these claims by their language expressly stat otherwise.

I claim:

1. Means for directing smoke upwardly to a smoke detection member, said means being a vertical airflow shaft adapted to be mounted between columns of palletized goods supported on racks, said shaft having sides adapted to extend from the back to front between adjacent vertically arranged palletized loads of goods said sides being joined by a pair of narrow end members, each of said end members being rigidly connected along one of its edges to one of said side members, means for detachably connecting each of said end members to the edge of the other of said sides to form a vertical airflow shaft of rigid narrow rectangular cross section open at both ends which shaft remains open throughout its length when the shaft is installed and while it is in use.

2. Means for directing smoke upwardly to a smoke detection member as described in claim 1 wherein each of said end members is rigidly connected to said one of said side members.

3. Means for directing smoke upwardly to a smoke detection member as described in claim 1 wherein said means for detachably connecting the end member of one of said members to the other of said side members is a spiral member which can be installed or removed by being rotated in the manner of a corkscrew.

4. Means for directing smoke upwardly to a smoke detection member as described in claim 1 wherein said means is comprised vertically of sections each of which extends the depth of the rack, said sections being stacked one upon another to form a vertical column, the top of which is at least as high as the top of the articles stored on the highest of the racks adjacent thereto.

5. Means for directing smoke upwardly to a smoke detection member, said means being a vertical airflow shaft adapted to be mounted between columns of palletized goods supported on racks, said shaft having side members adapted to extend from the back to the front between adjacent vertically arranged palletized loads of goods, said side members being joined by a pair of narrow end members, each of said end members being rigidly attached to one of said side members, means for detachably connecting each of said end members to the edge of the other of said side members to form a rigid narrow airflow shaft of rectangular cross section open at both ends at all times it is in use between said columns of palletized goods.

6. Means for direction smoke upwardly to a smoke detection member as described in claim 5 wherein said detachable connecting means is separable from at least one of said side or end members when they are to be separated for storage or shipping, the separated members being nestable during storage.

* * * * *